(12) United States Patent
Adam et al.

(10) Patent No.: US 9,476,454 B2
(45) Date of Patent: Oct. 25, 2016

(54) SLIDING ELEMENT

(75) Inventors: Achim Adam, Nauheim (DE); Joachim Schluter, Wiesbaden (DE)

(73) Assignee: Federal-Mogul Wiesbaden GmbH, Wiesbaden (DE)

( * ) Notice: Subject to any disclaimer, the term of this patent is extended or adjusted under 35 U.S.C. 154(b) by 1290 days.

(21) Appl. No.: 13/142,887

(22) PCT Filed: Dec. 28, 2009

(86) PCT No.: PCT/EP2009/067959
§ 371 (c)(1),
(2), (4) Date: Jun. 30, 2011

(87) PCT Pub. No.: WO2010/076306
PCT Pub. Date: Jul. 8, 2010

(65) Prior Publication Data
US 2011/0268944 A1 Nov. 3, 2011

(30) Foreign Application Priority Data
Dec. 30, 2008 (DE) ........................ 10 2008 055 194

(51) Int. Cl.
| B32B 7/02 | (2006.01) |
|---|---|
| B32B 27/38 | (2006.01) |
| B32B 3/00 | (2006.01) |
| B32B 27/00 | (2006.01) |
| B32B 5/16 | (2006.01) |
| B32B 19/00 | (2006.01) |
| B32B 9/04 | (2006.01) |
| F16C 33/20 | (2006.01) |
| F16C 9/00 | (2006.01) |
| F16J 1/02 | (2006.01) |
| F16J 9/26 | (2006.01) |

(52) U.S. Cl.
CPC .............. *F16C 33/201* (2013.01); *F16C 9/00* (2013.01); *F16C 33/203* (2013.01); *F16J 1/02* (2013.01); *F16J 9/26* (2013.01); *Y10T 428/24975* (2015.01); *Y10T 428/25* (2015.01); *Y10T 428/265* (2015.01); *Y10T 428/31511* (2015.04); *Y10T 428/31663* (2015.04); *Y10T 428/31855* (2015.04)

(58) Field of Classification Search
CPC .. F16C 33/1095; F16C 33/043; F16C 33/20; F16C 33/203
USPC ..................... 428/212–220, 329, 411.1–704; 508/100–109
See application file for complete search history.

(56) References Cited

U.S. PATENT DOCUMENTS

| 3,806,139 A | 4/1974 | Suzuki et al. |
|---|---|---|
| 4,308,119 A | 12/1981 | Russell |
| 4,899,702 A | 2/1990 | Sasaki et al. |
| 5,392,692 A | 2/1995 | Rao et al. |
| 5,430,938 A | 7/1995 | Rao et al. |
| 5,490,445 A | 2/1996 | Rao et al. |
| 5,531,195 A | 7/1996 | Onoda et al. |
| 5,598,763 A | 2/1997 | Rao et al. |
| 5,677,372 A | 10/1997 | Yamamoto et al. |
| 6,162,767 A | 12/2000 | Adam |
| 6,376,061 B1 | 4/2002 | Adam |
| 6,770,381 B2 | 8/2004 | Kanayama et al. |
| 7,842,399 B2 | 11/2010 | Pratt |
| 7,942,581 B2 | 5/2011 | Leonardelli |
| 8,088,496 B2 | 1/2012 | Kariya et al. |
| 8,119,577 B2 | 2/2012 | Stecher |
| 8,240,676 B2 | 8/2012 | Kariya et al. |
| 8,324,138 B2 | 12/2012 | Mergen |
| 2002/0104506 A1* | 8/2002 | Ederer ........................ 123/197.3 |
| 2004/0216605 A1 | 11/2004 | Nigro |
| 2007/0000468 A1 | 1/2007 | Azevedo et al. |
| 2007/0082825 A1 | 4/2007 | Kawakami et al. |
| 2007/0134508 A1* | 6/2007 | Pratt ........................ F16C 9/00 428/601 |
| 2008/0060603 A1* | 3/2008 | Kuroda et al. ............. 123/193.6 |
| 2008/0127819 A1* | 6/2008 | Maier .............................. 92/212 |
| 2008/0247687 A1* | 10/2008 | Stecher ............................. 384/7 |
| 2008/0248269 A1* | 10/2008 | Shibuya et al. .............. 428/215 |
| 2010/0140880 A1 | 6/2010 | Hayashi et al. |
| 2011/0268944 A1 | 11/2011 | Adam et al. |
| 2012/0242047 A1 | 9/2012 | Sasaki et al. |
| 2014/0225329 A1 | 8/2014 | Hayashi et al. |

FOREIGN PATENT DOCUMENTS

| CN | 1234334 A | 11/1999 |
|---|---|---|
| CN | 101213360 A | 7/2008 |
| DE | 2703918 A1 | 8/1977 |
| DE | 19614105 A1 | 10/1997 |
| DE | 10 2005 009552 A | 9/2006 |
| DE | 102005009552 A1 | 9/2006 |
| DE | 102008055194 A1 | 7/2010 |
| EP | 0 024 291 A1 | 3/1981 |
| EP | 0024291 A2 | 3/1981 |
| EP | 0 938 970 A1 | 9/1999 |
| EP | 0938970 A2 | 9/1999 |
| EP | 0984182 A1 | 3/2000 |
| EP | 1489152 A2 | 12/2004 |
| EP | 1775487 A2 | 4/2007 |
| EP | 1 892 429 A2 | 2/2008 |
| EP | 1892429 A2 | 2/2008 |

(Continued)

OTHER PUBLICATIONS

Dubbel: Taschenbuch fur den Maschinenbau. 22 Auflage. Berlin: Springer, 2007. S G 24-G 25.-ISBN 978-3-540-49714-1.

(Continued)

*Primary Examiner* — Prashant J Khatri
(74) *Attorney, Agent, or Firm* — Robert L. Stearns; Dickinson Wright PLLC

(57) ABSTRACT

The invention relates to a sliding element with a substrate and at least one layer of a sliding layer material applied onto the substrate. The sliding layer material can consist of an antifriction lacquer comprising at least one cross-linkable binder or at least one high-melting thermoplast material or of a material that contains a matrix of at last one high-melting thermoplast material or at least one duroplast material. Said sliding layer material contains $Fe_2O_3$ with a preferred fraction of 0.1 to 15 vol. %.

42 Claims, No Drawings

(56) References Cited

FOREIGN PATENT DOCUMENTS

| | | |
|---|---|---|
| EP | 1894987 A1 | 3/2008 |
| JP | 58023256 | 2/1983 |
| JP | 62233458 | 10/1987 |
| JP | 6426647 A | 1/1989 |
| JP | 64026647 A | 1/1989 |
| JP | 01206162 | 8/1989 |
| JP | 0478319 A | 3/1992 |
| JP | 4078319 A | 3/1992 |
| JP | 1137160 A | 2/1999 |
| JP | 11037160 A | 2/1999 |
| JP | 11320752 A | 11/1999 |
| JP | 2001140057 A | 5/2001 |
| JP | 2005 201289 A | 7/2005 |
| JP | 2005201289 A | 7/2005 |
| JP | 2007522410 A | 8/2007 |
| JP | 2008001955 A | 1/2008 |
| JP | 2008039185 A | 2/2008 |
| RU | 2361128 C2 | 7/2009 |
| WO | 8001805 A1 | 9/1980 |
| WO | 2005078296 A1 | 8/2005 |
| WO | 2008014531 A1 | 2/2008 |
| WO | 20080014531 A1 | 2/2008 |

OTHER PUBLICATIONS

Holleman-Wiberg: Lehrbuch der Anorganischen Chemie. 101. Auflage. Berlin: de Gruyter.-ISBN 3-11-012641-9.

* cited by examiner

SLIDING ELEMENT

BACKGROUND OF THE INVENTION

1. Technical Field

The invention refers to a sliding element with one substrate and at least one layer of a sliding layer material applied to the substrate. The invention also refers to preferred applications of such sliding elements.

2. Related Art

Sliding elements such as sliding bearing elements in engines mostly consist of multiple-layer materials with especially modified surfaces, which optimize the sliding characteristics. Usually, the surfaces of sliding bearing elements are metal layers, possibly based on lead, tin or aluminium, which are applied by galvanic processes, vaporization or mechanical plating.

Furthermore, non-metal sliding layers are known having an artificial resin base, which have been modified with regard to their properties, load capacity and resistance to wear.

Although the known coatings have a relatively high load capacity, this capacity is extremely limited, such that rapid failure of the sliding function results if the load capacity limit is exceeded. The associated exposure of the substrate material, which does not have sufficient emergency operating features, then causes the total failure of the sliding bearing element due to seizure.

Resin-based sliding bearing coatings have been used for many years as a tool for the reduction of the friction in mechanical constructions. Usually, metal, plastic and rubber components are coated, which need to be permanently easily movable without further lubrication. In the typical applications the loads are rather low and the boundary conditions such as temperature and media are non-critical. It is known from various patent applications, in particular from EP 0 984 182 A1 that applications in the engine, i. e. e. g. crank shaft bearings are also possible with such sliding bearing elements. In this document, an overlay with a matrix of PI, PAI, epoxy resin or a phenolic resin is also described, to which $Fe_3O_4$ can be added, amongst others, to reduce wear.

DE 196 14 105 A1 reveals a wear- and cavitation-resistant plastics sliding layer consisting of a matrix material made of PTFE or thermoplastic fluoropolymers, $Fe_2O_3$, and solid lubricants. This material is used for bearings e. g. as a guide element for shock absorbers, and is only suitable for low sliding speeds and low loads due to its structure and the soft fluoropolymer matrix.

From EP 1 775 487 A2, a sliding bearing is known, which has a metal carrier material and an aluminium alloy and a plastic sliding layer applied to it. In order to improve the bonding strength and cavitation resistance of the plastic sliding layer, a material is suggested that has a bonding agent made of PI, PAI, PBI, EP and FP and a solid lubricant such as $MoS_2$, graphite, PTFE and BN.

SUMMARY OF THE INVENTION AND ADVANTAGES

The task of the invention is to provide a sliding element that has a higher peak load capacity with improved wear resistance and that can be used at high temperatures and sliding speeds such as e.g. on moving components within combustion engines.

This task is solved by means of a sliding element in which the sliding layer material consists of a sliding lacquer with at least one cross-linkable bonding agent or at least one high-melting thermoplastic material, and wherein the sliding layer material contains $Fe_2O_3$. Alternatively, the sliding layer material consists of a material with a matrix of at least one high-melting thermoplastic material or at least one duroplastic material, and wherein the sliding layer material contains $Fe_2O_3$.

It is preferred that the sliding layer material solely contains $Fe_2O_3$ as an iron oxide.

A sliding lacquer is used in accordance with a first alternative.

A sliding lacquer is understood to be a liquid or powdery coating material containing additives for the improvement of the sliding capability of the surface, which is thinly applied to a substrate and which is formed into a continuous thin film due to chemical or physical processes such as e. g. evaporation of the solvent or hardening by UV radiation.

The cross-linkable bonding agent of the sliding lacquer preferably consists of PAI (polyamideimide), PI (polyimide), epoxy resin, PBI (polyben-zimidazole) and/or silicone resin. These polymers are characterized by high temperature resistance and excellent media resistance.

In another type, the bonding agent can be a bonding agent hardening by means of UV radiation. Such bonding agents are preferably unsaturated polyester resins and/or silicones.

In another type, the sliding lacquer can contain at least one high-melting thermoplastic material.

In accordance with a second alternative, a material with a matrix of at least one high-melting thermoplastic material or at least one duroplastic material is used.

High-melting thermoplastic materials are understood to be materials with a melting point above 230° C.

Polyarylates, PEEK (polyetheretherketone) and/or PES (polyether sulfone) can be primarily used as preferred high melting thermoplastics.

Preferred duroplastic materials are PAI (polyamideimide), PI (polyimide), epoxy resin, PBI (polybenzimidazole) and/ or silicone resin.

It has shown that the materials used in combination with $Fe_2O_3$ have a significantly better peak load capacity than sliding layer materials that do not contain iron oxide. Up to 20% better load capacity values are achieved.

It is supposed that the efficiency of the sliding layer material is improved by the combination of the $Fe_2O_3$ with the bonding agents or the matrix materials in accordance with the two alternatives, by means of which the increase of the wear rate with the specific bearing load is reduced. This increases the load capacity limit, which in turn significantly adds to the operational reliability of the bearings with loads below the load capacity limit.

These effects become evident with proportions of 0.1 to 15% by volume of $Fe_2O_3$. No improvement of the load capacity can be determined with lower proportions. Higher proportions however lead to a weakening of the matrix material or the cross-linkable bonding agent of the sliding coating.

The proportion of $Fe_2O_3$ related to the total sliding layer material is preferably 0.5 to 8% by volume.

It was able to be shown that the peak load capacity in crank shaft bearings can already be increased up to 120 MPa. These peak load capacity values are distinctly higher than those with a material combination acc. to EP 0 984 182 A1. The invention-related values are otherwise only reached by aluminium-based sputter coatings.

It has shown that the particle size of the $Fe_2O_3$ is also of significance. $Fe_2O_3$ with an average particle size of 0.01 to 5 μm is preferred. Powders with d50 of 0.1 to 0.5 μm are particularly advantageous.

D50 refers to the median of the grain sizes of the particles, wherein 50% of the particles are finer and 50% of the particles larger than the value specified.

The proportion of solid lubricants in the sliding layer material is preferentially up to about 30% by volume. The preferred range is approximately up to <9.5%. A particularly preferred range is >5 to 30% by volume.

Metal sulphides with layered structure, graphite, hexagonal boron nitride (hBN) and/or PTFE can be used as solid lubricants. Furthermore, the sliding layer material can contain hard materials with a proportion of up to 5% by volume, in particular a proportion of 3 to 5% by volume.

The hard materials are preferably nitrides, carbides, borides, oxides and/or metal powders, whereby the hard materials SiC, $Si_3N_4$, $B_4C_3$, cubic BN, $TiO_2$ or $SiO_2$ and metal powder made of Ag, Pb, Au, SnBi and/or Cu are preferred.

A particular type are multiple-layer systems made of sliding layers containing $Fe_2O_3$, whereby these multiple-layer systems can be designed such that an upper layer acts as a running-in layer e.g. due to the addition of hard particles for the conditioning of the shaft and the layer underneath acts as the permanent service layer.

A multiple-layer system can also be structured such that an additional layer of sliding is applied underneath the permanent service layer, which additionally increases the operational reliability of the bearings by optimisation, particularly with regard to wear resistance, thus delaying the full wearing down to the metal of the bearing.

An additional layer between the substrate and the sliding layer material can also be optimized with regard to the adhesion to the substrate to serve the purpose, similar to a primer, of improving the bonding of the layer of sliding coating or of the layer with a matrix of high-melting thermoplastics and duroplastics. This can be achieved, for example, by a few micrometer thickness, less additived or non-additived layer of matrix material.

Multiple-layer systems can be implemented as discrete plies of layers and also as gradient layers, for which the layer properties continuously change via the thickness.

The $Fe_2O_3$ content in the bottom layer is preferably higher than in the top layer.

Two layers are preferably applied to the substrate, whereby one layer consists of a layer of sliding layer material with $Fe_2O_3$ and one layer of sliding layer material without $Fe_2O_3$. This type has the advantage that the geometrical adaptation is accelerated, as the top layer then wears more quickly and hence the maximum load capacity is more quickly provided. Further wear is then reduced by the $Fe_2O_3$ content of the bottom layer.

Another type of multiple-layer system provides that only the bottom layer contains the $Fe_2O_3$, while all layers above it have no $Fe_2O_3$.

If more than two layers of sliding layer material are applied to the substrate, it is advantageous if the $Fe_2O_3$ content is reduced from the bottom to the top layer. A lower proportion of $Fe_2O_3$ or none at all in the top layer has the advantage that the geometrical adaptation is accelerated, as the top layer then wears more quickly and hence the maximum load capacity is more quickly provided. Further wear is then reduced by the iron oxide content of the bottom layer.

It is also intended that the $Fe_2O_3$ content within a layer is continuously reduced from bottom to top.

The substrate can consist of one or several layers.

The substrate preferably has at least one aluminium or copper alloy layer. The following alloys are also suitable as substrate material: Ni—, Sn—, Zn—, Ag—, Au—, Bi— and Fe alloys. All alloys can be used not only as a metal bearing layer but also as a thin top layer, whereby the sliding layer can be formed as an additional running-in layer depending on its composition for the adaptation or conditioning of the shaft material or as an independent sliding layer with a long service life.

The use of the invention-related layer/layers as sliding layer/sliding layers on CuSn—, CuNiSi—, CuZn—, CuSnZn—, AlSn—, AlSi—, AlSnSi— metal alloy bearings is particularly preferred.

The sliding layers can be applied with or without an intermediate layer. Nickel, silver, copper and/or iron may be used as intermediate layers.

The thickness of the layer or layers in the case of a multiple-layer system lies within a range of 1 to 40 μm.

The sliding bearing element can be a bearing shell with up to 100 mm. In this case the thickness of the layer or layers is between 5 and 15 μm.

If the sliding bearing element is a bearing shell with a diameter of >100 mm, thickness values from >15 μm to 40 μm are preferred.

Basically, two types are possible. In the first type the invention-related sliding layer is directly applied to the metal bearing layer. The second type involves the coating of a substrate consisting of a bearing metal with an already existing metal sliding layer that is preferably applied by sputtering or galvanic deposition.

The substrate preferably has a roughness $R_Z$ from 1 to 10 μm, in particular from 3 to 8 μm. $R_Z$ is understood to be the average surface roughness acc. to DIN EN ISO 4287:1998.

The roughness improves adhesion and leads to the fact that in the case of wear, first only the peaks i.e. the very small surface proportions of the substrate are exposed, which increases the load-bearing capacity without having the proneness to seizure of larger exposed areas.

The required surface roughness levels can be achieved by mechanical procedures such as sand blasting or grinding, but also chemically by phosphating or slight etching.

Preferred uses are fluid-lubricated applications.

It is preferable to use the sliding elements as sliding bearings in combustion engines.

As the sliding elements are characterised by a high peak load, use of the sliding elements as sliding bearings for cranks shafts is particularly intended. Other preferred uses are sliding elements as piston skirts and piston rings, whereby in particular the ring flanks have the invention-related layer structure in order to prevent micro-welding with the piston groove surface.

DETAILED DESCRIPTION

Several examples with test results are listed below.

Table 1 contains only copper alloy substrates and table 2 aluminium substrates and examples for dual layers.

TABLE 1

| | | | | | | | |
|---|---|---|---|---|---|---|---|
| (figures in % by volume) | | | | | | | |
| No. | Substrate | Intermediate layer | Bonding agent | Solid lubricant | Hard material | Qty. $Fe_2O_3$ | Max UW load in MPa |
| 1 | CuNi2Si | | PAI | 25% hBN | 5% SiC | 5% | 100 |
| R1 | CuNi2Si | | PAI | 30% hBN | 5% SiC | | 90 |
| 2 | CuNi2Si | | PAI | 15% $MoS_2$ | | 5% | 110 |
| R2 | CuNi2Si | | PAI | 20% $MoS_2$ | | | 100 |

TABLE 1-continued (figures in % by volume)

| No. | Substrate | Intermediate layer | Bonding agent | Solid lubricant | Hard material | Qty. $Fe_2O_3$ | Max UW load in MPa |
|---|---|---|---|---|---|---|---|
| 2 | CuNi2Si | | PAI | 15% $WS_2$ | | 8% | 110 |
| R2 | CuNi2Si | | PAI | 23% $WS_2$ | | | 95 |
| 3 | CuNi2Si | | PAI | 15% graphite | | 5% | 90 |
| R3 | CuNi2Si | | PAI | 15% graphite | | | 85 |
| 3 | CuNi2Si | | PAI | 10% graphite, 10% PTFE | | 5% | 85 |
| R3 | CuNi2Si | | PAI | 10% graphite, 10% PTFE | | | 80 |
| 4 | CuNi2Si | | PEEK | 10% $MoS_2$, 10% hBN | | 3% | 100 |
| R4 | CuNi2Si | | PEEK | 13% $MoS_2$, 10% hBN | | | 90 |
| 5 | CuSn8Ni | Ni | PAI | 15% $MoS_2$ | | 5% | 110 |
| R5 | CuSn8Ni | Ni | PAI | 20% $MoS_2$ | | | 100 |
| 6 | CuSn8Ni | | PAI | 30% $MoS_2$ | | 10% | 100 |
| R6 | CuSn8Ni | | PAI | 40% $MoS_2$ | | | 95 |
| 7 | CuSn8Ni | | PAI | 15% $MoS_2$, 5% hBN | | 5% | 120 |
| R7 | CuSn8Ni | | PAI | 15% $MoS_2$, 10% hBN | | | 100 |
| 8 | CuSn8Ni | | PAI | 15% $MoS_2$ | 5% $Si_3N_4$ | 5% | 95 |
| R8 | CuSn8Ni | | PAI | 20% $MoS_2$ | 5% $Si_3N_4$ | | 85 |
| 9 | CuSn8Ni | Ag | PAI | 30% $MoS_2$ | | 10% | 115 |
| R9 | CuSn8Ni | Ag | PAI | 40% $MoS_2$ | | | 105 |
| 10 | CuSn8Ni | | PES | 15% $MoS_2$ | | 3% | 105 |
| R10 | CuSn8Ni | | PES | 18% $MoS_2$ | | | 90 |
| 11 | CuSn10Bi3 | | PAI | 15% $MoS_2$ | | 5% | 100 |
| 12 | CuSn10Bi3 | | EP | 15% hBN | | 5% | 90 |
| R12 | CuSn10Bi3 | | EP | 20% hBN | | | 80 |
| 13 | CuSn10Bi3 | | Silicone resin | 10% $MoS_2$, 10% hBN | | 3% | 90 |
| R13 | CuSn10Bi3 | | Silicone resin | 13% $MoS_2$, 10% hBN | | | 80 |
| 14 | CuPb23Sn | Ni | PAI | 15% $MoS_2$ | | 5% | 105 |
| 15 | CuPb23Sn | | PAI | 15% $MoS_2$, 5% hBN | | 5% | 110 |
| 16 | CuPb23Sn | | EP | 15% hBN | 3% $TiO_2$ | 5% | 100 |

TABLE 2

(figures in % by volume)

| | | | 2nd layer | | | | Max UW |
|---|---|---|---|---|---|---|---|
| No. | Substrate | 1st layer | Bonding agent | Solid lubricant | Hard material | Qty. $Fe_2O_3$ | load in MPa |
| 17 | AlSn10Ni2MnCu | | PAI | 15% $MoS_2$, 5% hBN | | 5% | 85 |
| 18 | AlSn10Ni2MnCu | | PES | 15% $MoS_2$ | | 3% | 85 |
| 19 | AlNi2MnCu | | PAI | 15% $WS_2$ | 5% SiC | 8% | 95 |
| 20 | AlNi2MnCu | | EP | 15% hBN | | 5% | 95 |
| 21 | AlSn6Si4CuMnCr | | PAI | 10% graphite 10% PTFE | 3% $B_4C$ | 5% | 80 |
| 22 | AlSn6Si4CuMnCr | | PEEK | 10% $MoS_2$ 10% hBN | | 3% | 85 |
| 23 | CuNi2Si | PAI, 10% hBN 5% $Fe_2O_3$ | PAI | 15% $Mos_2$ 15% hBN | | | 115 |
| 24 | CuNi2Si | PAI 10% hBN 5% $Fe_2O_3$ | PAI | 15% $MoS_2$ | 5% SiC | 3% | 105 |
| 25 | CuNi2Si | PAI 10% hBN 10% $Fe_2O_3$ | PAI | 15% $MoS_2$ | | 3% | 110 |

Underwood tests were performed for the assessment of the efficiency. For this, a shaft with eccentric weights rotates in rigidly mounted connecting rods. Mounting in the connecting rods is provided by the test bearings. The test bearings have a wall thickness of 1.4 mm and a diameter of 50 mm. The specific load is adjusted via the bearing width, the speed is 4000 U/m. Assessment criteria are sliding layer fatigue and wear after 100 h of continuous running. The limit load in MPa is stated where the layer is worn down to max. 5% of the sliding surface to the substrate or where there are signs of fatigue.

In order to substantiate the effect of the iron oxide, reference tests each designated with an R are listed in Table 1. The tests show that an increase of the load capacity of up to 20% is possible by the addition of $Fe_2O_3$.

For the aluminium substrates, examples 17-22, the fatigue strength of the substrate is respectively the limiting factor; however, an improvement in achieved here also by means of improved adaptability due to the invention-related sliding layer material. The main purpose of the invention-related sliding layer material is to optimise the sliding characteristics, if only a small proportion of the soft phase is contained in the alloy.

The double layer in example 23 is designed such that there is an increased adaptability due to the lower proportion of bonding agent and the higher proportion of solid lubricant in the top layer.

Example 24 is a layer construction for shafts with poor surfaces such as spheroidal grey cast iron that are additionally polished by the hard materials.

In example 25 the concentration of the $Fe_2O_3$ in the bottom layer rises and increases the wear resistance, whereby the top layer is preferably designed as an adaptation layer.

The invention claimed is:

1. A sliding element with a substrate and with at least one layer of a sliding layer material applied to the substrate, wherein the sliding element is for fluid lubricated applications,
   wherein the sliding layer material is a sliding lacquer with at least one cross-linkable bonding agent consisting of polyamideimide (PAI), polyimide (PI), polybenzimidazole (PBI) and/or silicone resin or a sliding lacquer with at least one high-melting thermoplastic material consisting of polyarylates and/or polyether sulfone (PES), the sliding layer material contains $Fe_2O_3$,
   or the sliding layer material is a material with a matrix of at least one high-melting thermoplastic material consisting of polyarylates, and/or polyether sulfone (PES) or a material with a matrix of at least one duroplastic material consisting of polyamideimide (PAI), polyimide (PI), polybenzimidazole (PBI) and/or silicone resin, and wherein the sliding layer material contains $Fe_2O_3$,
   wherein the proportion of $Fe_2O_3$ related to the total sliding layer material is 0.5 to 15% by volume;
   the sliding lacquer or the matrix of the sliding layer material contains solid lubricants with a proportion of ≥5 to 30% by volume of the sliding layer material;
   the solid lubricants are metal sulphides with layers structure, graphite, hexagonal boron nitride (hBN) and/or polytetrafluoroethylene (PTFE);
   the sliding lacquer or the matrix of the sliding layer material contains hard materials with a proportion of 3% by volume to 5% by volume of the sliding layer material; and
   the hard materials are nitrides, carbides, borides, oxides and/or metal powders.

2. The sliding element in accordance with claim 1, wherein the hard materials are SiC, $Si_3N_4$, $B_4C_3$, cubic BN, $TiO_2$, $SiO_2$, and/or powders consisting of Ag, Pb, Au, Sn, Bi and/or Cu.

3. The sliding element in accordance with claim 2, wherein the proportion of $Fe_2O_3$ has an average particle size of 0.01 to 5 µm.

4. The sliding element in accordance with claim 1, wherein the sliding layer material is the sliding lacquer with the at least one bonding agent and the bonding agent is one that hardens by means of UV radiation.

5. The sliding element in accordance with claim 1 wherein the proportion of $Fe_2O_3$ related to the total sliding layer material is 0.5 to 8% by volume.

6. The sliding element in accordance with claim 1, wherein the proportion of $Fe_2O_3$ has an average particle size of 0.01 to 5 µm.

7. The sliding element in accordance with claim 1, wherein the hard materials are SiC, $Si_3N_4$, $B_4C_3$, cubic BN, $TiO_2$ or $SiO_2$.

8. The sliding element in accordance with claim 1, wherein the metal powders consist of Ag, Pb, Au, Sn, Bi and/or Cu.

9. The sliding element in accordance with claim 1, wherein the sliding layer material further contains hexagonal boron nitride (hBN).

10. The sliding element in accordance with claim 9, wherein the hexagonal boron nitride (hBN) is in a proportion of ≥5 to 30% by volume relative to the total volume of the sliding layer material.

11. The sliding element in accordance with claim 1, wherein two layers of the sliding layer material are applied to the substrate.

12. The sliding element in accordance with claim 11, wherein the $Fe_2O_3$ content in the bottom layer is higher than in the top layer.

13. The sliding element in accordance with claim 1, wherein two layers of material are applied to the substrate, whereby one layer consists of the sliding layer material with $Fe_2O_3$ and the other layer is without $Fe_2O_3$.

14. The sliding element in accordance with claim 13, wherein the bottom layer is the sliding layer material containing the $Fe_2O_3$.

15. The sliding element in accordance with claim 1, wherein more than two layers of the sliding layer material are applied to the substrate and further wherein the proportion of $Fe_2O_3$ is reduced from the bottom to the top layer.

16. The sliding element in accordance with claim 1, wherein the proportion of $Fe_2O_3$ within the at least one layer is continuously reduced from bottom to top.

17. The sliding element in accordance with claim 1, wherein the substrate has at least one layer made of an Al or Cu alloy.

18. The sliding element in accordance with claim 1, wherein the thickness of the layer or layers applied to the substrate is 1 to 40 µm.

19. The sliding element in accordance with claim 18, wherein the sliding element is a bearing shell with a diameter of up to 100 mm and the thickness of the layer or layers applied to the substrate is 5 to 15 µm.

20. The sliding element in accordance with claim 18, wherein the sliding element is a bearing shell with a diameter greater than 100 mm and the thickness of the layer or layers applied to the substrate is ≥15 µm to 40 µm.

21. The sliding element in accordance with claim 1, wherein the substrate comprises a sliding layer to which the sliding layer material is applied.

22. The sliding element in accordance with claim 21, wherein the sliding layer is a galvanic or sputtered sliding layer.

23. The sliding element in accordance with claim 21, wherein the metal sliding layer of the substrate is applied by at least one of electroplating, sputtering, vaporization, and mechanical plating.

24. The sliding element in accordance with claim 21, wherein the sliding layer is formed of metal.

25. The sliding element in accordance with claim 1, wherein the substrate comprises a metal bearing layer to which the sliding layer material is applied.

26. The sliding element in accordance with claim 1, wherein the substrate comprises an intermediate layer made of nickel, silver, copper and/or iron to which the sliding layer material is applied.

27. The sliding element in accordance with claim 1, wherein the substrate has a roughness $R_z$ of 1 to 10 μm.

28. The sliding element in accordance with claim 1, wherein the substrate comprises a sliding bearing for combustion engines.

29. The sliding element in accordance with claim 1, wherein the substrate comprises a bearing for crank shafts.

30. The sliding element in accordance with claim 1, wherein the substrate comprises a piston ring.

31. The sliding element in accordance with claim 1, wherein the substrate comprises a piston skirt.

32. The sliding element in accordance with claim 1, wherein the substrate comprises part of a piston assembly.

33. The sliding element in accordance with claim 1, wherein the substrate includes a metal sliding layer and has an average surface roughness $R_z$ of 1 to 10 μm.

34. The sliding element in accordance with claim 33, wherein the average surface roughness $R_z$ is 3 to 8 μm.

35. The sliding element in accordance with claim 1, wherein the sliding element is a piston ring,
   the substrate including a bearing layer formed of metal and a metal sliding layer applied to the bearing layer,
   the substrate having an average surface roughness $R_z$ of 1 to 10 μm, and
   the sliding layer material is applied to the metal sliding layer of the substrate.

36. A piston ring, comprising:
   a substrate including a bearing layer formed of metal and a metal sliding layer applied to the bearing layer,
   the substrate having an average surface roughness $R_z$ of 1 to 10 μm, and
   a sliding layer material applied to the metal sliding layer of the substrate,
   the sliding layer material including a matrix formed of at least one polymer,
   the sliding layer material including $Fe_2O_3$ in a proportion of 0.5 to 8% by volume relative to the total volume of the sliding layer material, and
   wherein the at least one polymer of the sliding layer material consists of polyamideimide (PAI), polyimide (PI), polybenzimidazole (PBI), silicone resin, polyarylate, and/or polyether sulfone (PES);
   the sliding layer material contains solid lubricants with a proportion of ≥5 to 30% by volume of the sliding layer material;
   the solid lubricants are metal sulphides with layers structure, graphite, hexagonal boron nitride (hBN) and/or polytetrafluoroethylene (PTFE);
   the sliding layer material contains hard materials with a proportion of 3% by volume to 5% by volume of the sliding layer material; and
   the hard materials are nitrides, carbides, borides, oxides and/or metal powders.

37. The piston ring in accordance with claim 36, wherein the hard materials are SiC, $Si_3N_4$, $B_4C_3$, cubic BN, $TiO_2$, $SiO_2$, and/or powders consisting of Ag, Pb, Au, Sn, Bi and/or Cu.

38. The piston ring in accordance with claim 37, wherein the proportion of $Fe_2O_3$ has an average particle size of 0.01 to 5 μm.

39. The piston ring of claim 36, wherein the substrate has an average surface roughness $R_z$ of 3 to 8 μm.

40. The piston ring of claim 36, wherein the metal sliding layer of the substrate is applied by at least one of galvanization, sputtering, vaporization, and mechanical plating.

41. The piston ring of claim 36, wherein the sliding layer material further contains hexagonal boron nitride (hBN).

42. The piston ring of claim 41, wherein the hexagonal boron nitride (hBN) is in a proportion of ≥5 to 30% by volume relative to the total volume of the sliding layer material.

* * * * *

UNITED STATES PATENT AND TRADEMARK OFFICE
CERTIFICATE OF CORRECTION

PATENT NO.        : 9,476,454 B2
APPLICATION NO.   : 13/142887
DATED             : October 25, 2016
INVENTOR(S)       : Achim Adam and Joachim Schluter Page 1 of 1

It is certified that error appears in the above-identified patent and that said Letters Patent is hereby corrected as shown below:

Column 2 Line 51 remove "coating" and replace with "lacquer"

Column 3 Line 28 remove "coating" and replace with "lacquer"

Signed and Sealed this
Fifteenth Day of August, 2017

Joseph Matal
*Performing the Functions and Duties of the*
*Under Secretary of Commerce for Intellectual Property and*
*Director of the United States Patent and Trademark Office*